H. McCLEARY.
RESILIENT TIRE.
APPLICATION FILED MAR. 29, 1912.
1,067,668.
Patented July 15, 1913.
3 SHEETS—SHEET 1.
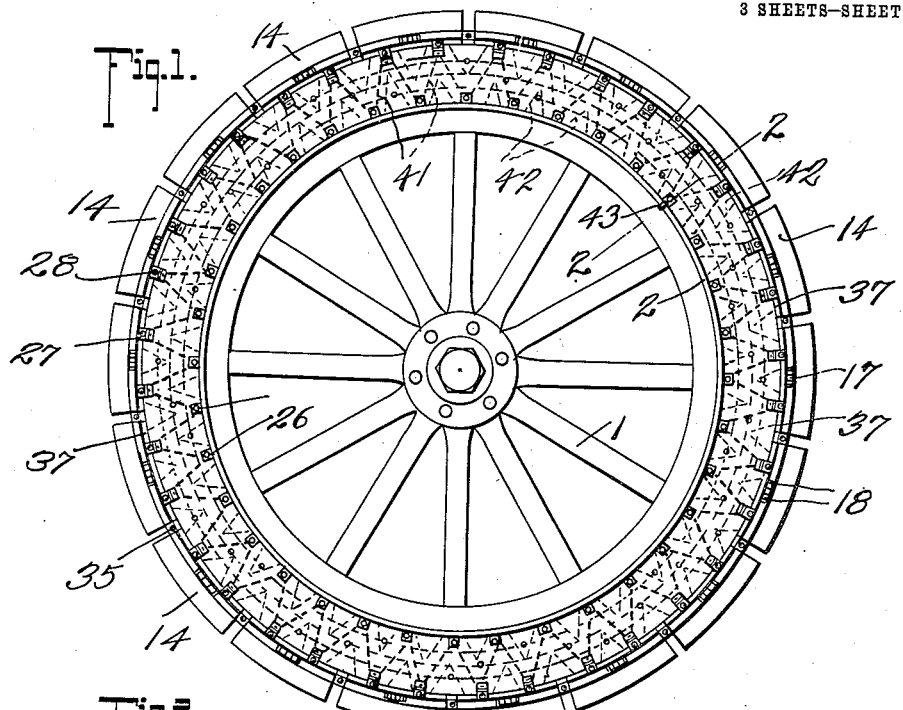
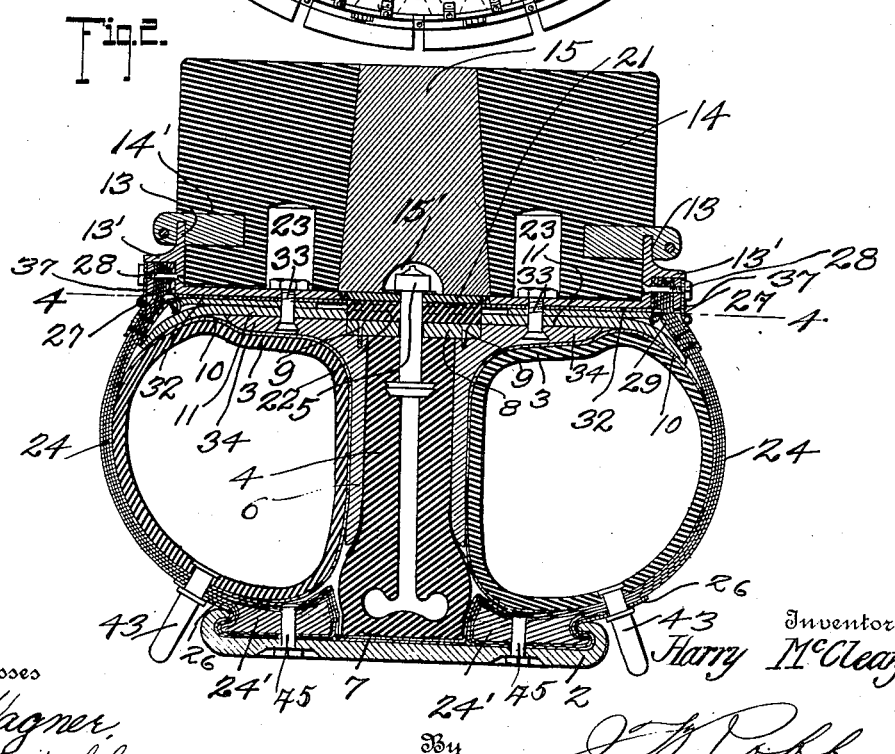
Witnesses
Inventor
Harry McCleary
By
Attorney

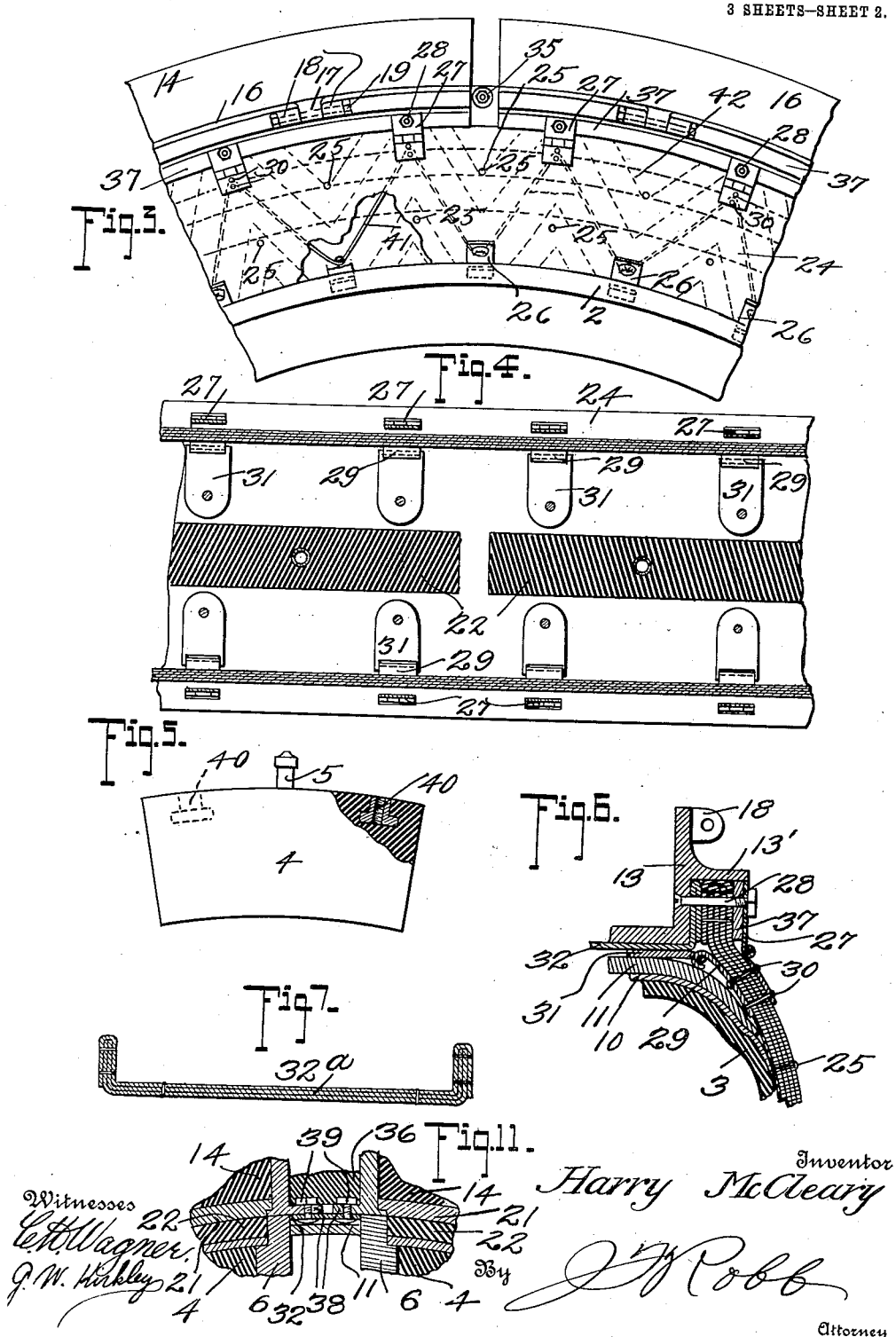

H. McCLEARY.
RESILIENT TIRE.
APPLICATION FILED MAR. 29, 1912.
1,067,668.
Patented July 15, 1913.
3 SHEETS—SHEET 3.
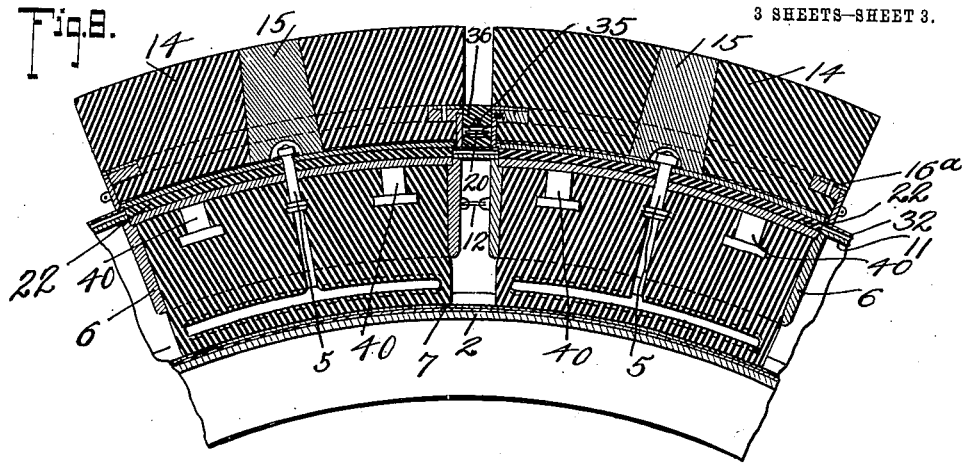
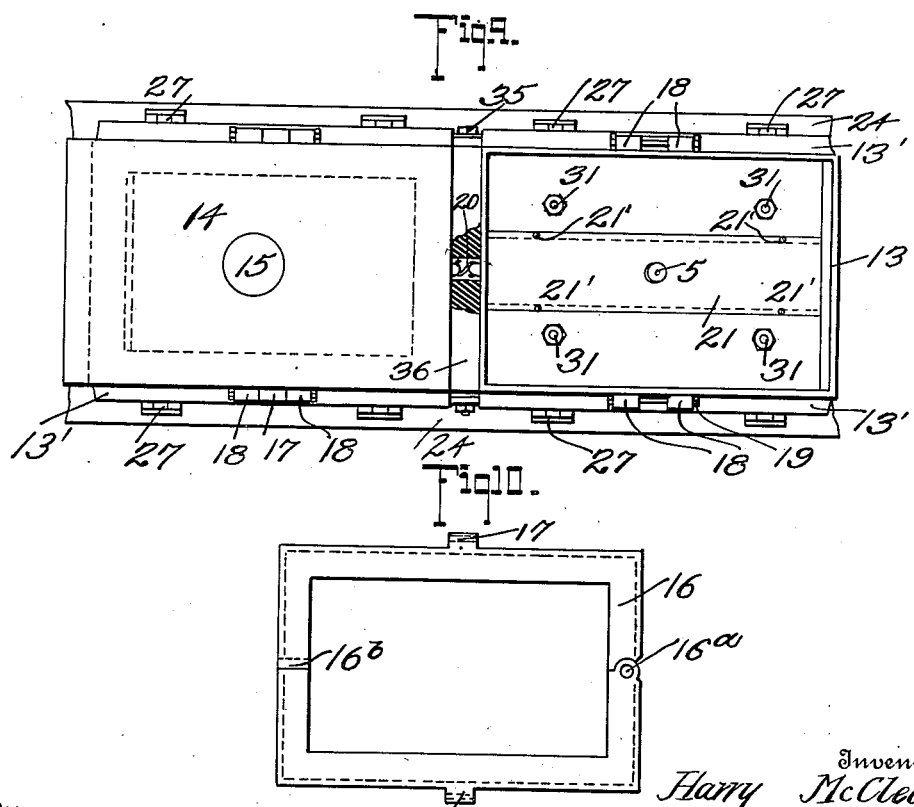
Witnesses
E. H. Wagner.
G. W. Kirkley
Inventor
Harry McCleary
By J. H. Poff
Attorney

UNITED STATES PATENT OFFICE.

HARRY McCLEARY, OF WASHINGTON, DISTRICT OF COLUMBIA.

RESILIENT TIRE.

1,067,668.　　　　Specification of Letters Patent.　　Patented July 15, 1913.

Application filed March 29, 1912. Serial No. 687,072.

*To all whom it may concern:*

Be it known that I, HARRY McCLEARY, a citizen of the United States, residing at Washington, in the District of Columbia, have invented certain new and useful Improvements in Resilient Tires, of which the following is a specification.

A serious disadvantage incidental to the use of the present forms of pneumatic tires employed for motor and other vehicle wheels resides in the fact that said tires are not only susceptible of being punctured with the usual results, but once the tire becomes flat it is necessary that the vehicle be driven with a wheel running on its rim, so to speak, until the punctured tire or tires are repaired or the inflatable tube of the same replaced.

A primary object of the present invention is the production of a tire of the pneumatic type in order to retain the resilient qualities of this class of tires but to so construct the tire that in the event of deflation of one or more cushions of which it is comprised, there will be auxiliary means to support the tread of the tire and prevent the rim of the wheel to which the tire is applied from damage, or injury to the tire itself that is likely to be caused by the deflation of the ordinary tires now most commonly used.

It is further contemplated that the auxiliary means aforesaid shall be sufficiently resilient as to form a fair working substitute for the more elastic cushion or cushions that may have been deflated, so far as temporary usage is concerned.

A further object of the present invention has been to provide a tire composed of a suitable tread, a cushion or cushions comprising inflated tubes preferably for supporting the tread and incasing means to protect the inflated members, but which may be very easily detached to afford access to the cushions for purposes of repair, replacing, or the like.

Supplementing the foregoing objects, it has been my intention in the construction of the tire of my invention to provide a general assemblage of parts wherein not only are the inflated members readily accessible but wherein certain members forming a composite tread are readily removable not only to permit of replacing the same but to permit of quick access to other parts forming essential details of the tire construction.

For a full understanding of the present invention, reference is to be had to the following description and to the accompanying drawings, in which—

Figure 1 is a side elevation of a tire embodying my invention applied to a wheel. Fig. 2 is a section on the line 2—2 of Fig. 1. Fig. 3 is an enlarged side elevation, broken away, bringing out more clearly the manner of reinforcing the casing sides, the manner of attachment of said sides to the tread parts and to the rim, and the general arrangement. Fig. 4 is a sectional view taken about on the line 4—4 of Fig. 2. Fig. 5 is a side elevation partly broken away of one of the members of the central composite cushion. Fig. 6 is an enlarged section, parts being broken away, bringing out more clearly the manner of connecting a casing side with the tread. Fig. 7 is a sectional view of a modified form of protecting strip adapted to be placed intermediate a tread socket member, and the hollow metal members forming a part of the central cushion. Fig. 8 is a sectional view, circumferentially of the tire, parts being broken away. Fig. 9 is a fragmentary view of the tread, showing two of the socket members, one having its tread block in place and the other with the latter part removed. Fig. 10 is a top plan view of a locking frame, one of which is associated with each tread socket member. Fig. 11 is a fragmentary sectional view showing a modified means for flexibly connecting the socket members of the tread.

Throughout the following detail description and on the several figures of the drawings, similar parts are referred to by like reference characters.

In carrying out my invention, the tire when complete may be said to comprise spaced inflatable cushions between which is arranged an auxiliary cushion, a suitable tread being located so as to practically surround the aforesaid cushions. This tread is supported primarily by the inflatable or main cushions, the weight on the wheel being sustained by the latter with customary resiliency, and said weight being only received upon the central auxiliary cushion to a partial extent when one of the inflatable main cushions becomes deflated and to a whole extent only when both of the main inflatable cushions are deflated. The central auxiliary cushion is of composite form comprising a number of resilient members carried preferably in metallic housings, the latter being linked together and forming segments extending around the whole wheel, all properly protected, and preferably with the parts or segments so arranged as to correspond with segments of the tread which is likewise of composite form.

Specifically describing the invention, 1 denotes a wheel of ordinary type which is provided with the rim 2, my tire being shown as properly applied to the latter. The body of my tire comprises two main inflatable cushions 3 in spaced relation and of continuous or endless form so as to extend entirely around the rim 2. Between the main air cushions 3 is located a central auxiliary cushion which is of composite form and comprises a plurality of resilient members 4. The members 4 may be inflated if desired, for which purposes a suitable air valve and nipple 5 is applied to each member 4. The members 4 may be of solid rubber or other resilient substance if desired, within the purview of the invention. A suitable number of the central cushion members 4 are provided to surround the rim 2 and each member is partly incased by a metallic housing 6, the latter being of long, narrow form and open at its lower end so that the cushion member 4 may protrude downwardly from said lower end into substantially direct engagement with the rim 2, direct contact of the parts 4 and 2 being prevented by the provision of layers of canvas or similar material, shown at 7. The upper end of each housing 6 is closed by a plate 8 detachably secured by suitable fastenings such as screws 9, and the valve nipple 5 passes through an opening in the plate 8 of the adjacent housing. Between each housing 6 and the main cushions 3 are interposed strips of leather or equivalent material shown at 10, and said strips extend practically entirely around the wheel in contact with the cushions 3. Overlapping the upper portions of the cushions 3 and also extending over each of the housings 6, is a protecting layer or element 11, made of thermoid, composition, or the like.

The foregoing describes practically all of the essential parts of the body of the tire with the exception of incasing means to be hereinafter more fully set forth.

The tread of the tire, which is of composite form also, is made up of a number of segments or sections corresponding with the equivalent parts of the central cushion, which equivalent parts may be said to be the cushion members 4, housings 6 and attached parts. The housings 6 are linked together, so to speak, by the link members 12, shown most clearly in Fig. 8 and the equivalent parts of the tread are linked together in a similar manner, as will be presented later on. As the segments or sections of the tread are all of identical form, one only will be described. Each segment is composed of a base or socket member 13 consisting of a rectangular body virtually forming a receptacle to receive the lower end portion of a tread block 14. The block 14 is preferably of rubber or of equivalent resilient substance, and is provided with a center 15 in the form of a tapering plug fitting in a corresponding opening in the block 14 and prevented from displacement by reason of its tapered formation in a manner readily evident upon reference to the drawing. The lower end of the center 15 may be recessed, as shown at 15' so as to receive the upper end of the valve nipple 5. The sides and ends of the block 14 are curved, as shown at 14' so as to receive therein the corresponding sides and ends of a locking member or frame 16. The frame 16 is of rectangular form and is adapted to fit into the upper end of the socket member 13. The frame 16 furthermore is composed of sections hinged at one end, as shown at 16ᵃ and having the opposite ends overlapping, as shown at 16ᵇ. When the frame 16 is received in the socket member 13, it will be evident that the sections of the frame are held from separating movement and in this manner, the frame is practically locked in engagement with the block 14, the curved portions 14' of which receive the sides and ends of the frame 16. In order to prevent displacement of the frame 16 from its corresponding socket member 13, an apertured lug 17 is formed on each side of the frame and fits between a pair of lugs 18 provided on the adjacent side of the socket member 13, a detachable fastening bolt 19 passing through the matching lugs 17 and 18 to thus secure the parts 13 and 16 together. The various base or socket members 13 are linked or otherwise flexibly connected together by means of links 20 engaging eyes formed at the ends of said members 13 and it will be apparent that the connected members 13 really form a flexible and sectional base for the tread comprising the same.

In the bottom of each socket member 13 is formed a longitudinal opening or slot normally closed by a plate 21 normally secured to the member 13 by suitable fastenings shown at 21'. The plate 21 is detachable in order to have access to the cushion member 4 beneath the same, for which purpose, the plate 8 would, of course, have to be removed from the housing 6. Between the parts 8 and 21 is interposed a filler member 22 that may be made of rubber or equivalent substance.

It will be apparent that should it be desired to replace the center 15 of any one of the blocks 14, it would only be necessary to detach the locking frame 16, remove the block 14 and accomplish the desired result.

When the locking frame 16 is detached by removal of the bolts 19, it is necessary to raise the parts 16 and 14 together until the frame 16 is disengaged from the socket member 13, whereupon the size of the frame may be spread by pivotal movement to separate the block 14 from said frame. By the removal of the block 14 and frame 16, those parts of the tire beneath become readily accessible for any purposes desired. It is contemplated that the blocks 14 may be provided with chambers 23 to promote their resiliency but these chambers may be dispensed with, and under certain conditions, according to the desire of the manufacturer, the centers 15 may be done away with as well, within the contemplation of the invention. It may be noted here that the centers 15 will preferably be made of cork or substance somewhat less resilient than the blocks 14, under which conditions, in the actual use of the tire, weight received on the tread members 14 has a tendency to cause these members to yield to a somewhat greater extent than the centers 15, whereupon the latter will project slightly from the surface of the members 14 and thus constitute anti-skidding elements.

The base of the tread which is above described as composed of the members 13 linked together, is peculiarly connected to the rim 2 of the wheel by means of incasing members 24, one of which is located at each side of the tire. The members 24 are formed with the basal flanges 24' to interlock with the flanges of the rim 2 in a manner similar to the ordinary interlocking of similar parts in conventional types of tires now in use. Said incasing members 24 will preferably be made of layers of leather or similar material folded about enlargements of rubber or composition, which enlargements form really the flanges 24' aforesaid. The various layers of material forming each incasing member 24 may be riveted or otherwise secured together, the rivets being designated 25 in the drawings. At its lower edge, each incasing member 24 has a plurality of hooks 26 engaging with the adjacent flange of the rim 2, said hooks being riveted or secured to the member 24. At its upper edge, each member 24 has a plurality of hinged connecting plates 27 and fastening bolts or the like 28 pass through the plates 27, the upper folded edges of the member 24 and through the adjacent sides of all of the socket members 13 to firmly but detachably connect said parts together. The hinged plates 27 are applied to the outer sides of each incasing member and to the inner sides of each member 24 near its upper edge, are the hook plates 29 secured preferably by the same rivets or fastenings 30 as are used to secure the plates 27 to the part 24. The hook plates 29 are seen clearly in Fig. 4 of the drawings and they engage with short tie plates 31 which are arranged between a strip of leather 32 and the composition material designated 11. Bolts or similar fastenings 33 pass through the bottom portions of the socket members 13, through the parts 11 and 32, through the plates 31 and through outstanding flanges 34 of the housings 6, said various parts being thus rigidly or firmly secured together.

From the foregoing, it will be apparent that each incasing member 24 is firmly attached at its upper edge to the sides of the socket members 13 which form the tread base and also to the bottoms of said tread members, the latter connection being established by the tie plates 31. An extremely serviceable connection is formed in the above manner and a connection of equivalent substantiality afforded between the rim 2 and the lower edge portions of each incasing member 24.

To have access to any portion of a main cushion 3, it is only necessary to detach certain of the fastening bolts 28 from the hinge plates 27, whereupon the incasing member 24 can readily be pulled outward, and said cushion will thus be exposed for such operation as may be necessary thereon. To remove the cushion entirely, the adjacent incasing member 24 should, of course, be detached from all of the segments of the tread, by the operation above described and the disengagement of the several hook plates 29 from the tie plates 31.

The strip 32 above referred to will be of sufficient length to pass entirely around the wheel, over the covering member 11 which, as before described, is of composition material. The parts 11 and 32 are cut out at intervals to provide openings through which the parts 8 and 22 may be removed or inserted into their proper positions. The edges of the strip 32 are upturned, as shown in Figs. 2 and 6 so as to be secured to the opposite sides of the socket or base members 13 by the fastening bolts 28. It will furthermore be noted that the members 13 are formed at their opposite sides with flanges 13' overhanging the upper edges of the incasing members 24 and the adjacent edges of the strip 32. If desired, as shown in Fig. 7, the strip 32ª composed of laminæ may be substituted for the strip 32 hereinbefore described. The flanges 13' form a protecting means for the portions of the incasing members 24 adjacent thereto in a manner readily evident.

In order to prevent dirt or foreign matter from working in between the main inflated cushions 3 between the segments or sections of the tread, it is contemplated to provide filler members 36, one of which is situated between the adjacent ends of spaced socket or base members 13 and this filler member may be made of rubber, or the like, being transversely apertured so as to permit the link connection 20 to pass therethrough and to thereby house said connection. To afford a more compact arrangement, a bolt or fastening 35 may pass longitudinally through the filler member 36, and also through the portions of the members 24 and 32 exposed between the socket members 13 to unite the several members 24, 32 and 36 in a firm substantial manner.

Against the outer side of each incasing member 24 at its outermost edge, are the clamp plates 37, one for each segment of the tread, and in direct engagement with which the hinged plates 27 are located. The plates 37 merely afford broad pressure surfaces to engage the outer edges of the incasing members 24 in holding the same in proper position.

As seen in Fig. 11, the socket member 13 may be connected together by a modified means comprising lugs 38 which are fastened by bolts 39 to the continuous leather or equivalent strip 32. By using the connection just described, the link connections 20 may be dispensed with, or the two connections could be used together, as desired.

In the event it should be desired to remove any one of the cushion members 4 without displacing its corresponding housing 6, to facilitate this operation, threaded sockets 40 will be embedded in the body of each cushion member, as shown most clearly in Fig. 5 of the drawings, said members 40 being adapted to be engaged by suitable means for facilitating removal of the part 4 bodily.

The formation of each incasing member 24 constitutes a special feature of the invention and referring particularly to Figs. 1 and 3 of the drawings, it will be noted that reinforcing cables, wires, or equivalent parts 41 are interposed between the layers of material comprising each incasing member. Said cables or wires 41 are interlaced, so to speak, with certain rivets 25 located at the inner and outer edge portions of each incasing member and which rivets are preferably those which assist in securing the plates 26 and 27 to the member 24. Since the incasing members are made of leather and the inflation of the main cushions 3 subjects them to great strain under actual conditions of service, the provision of the reinforcing means 41 is particularly advantageous in order to avoid undue stretching of the parts 24 and to generally increase the strength of the same. The arrangement of the cables or wires 41 virtually provides a number of V-shaped reinforcing elements between the inner and outer edges of each incasing member and to connect the layers of material forming each member aforesaid, it is contemplated to employ V-shaped lines of stitching 42, in spaced relation to one another and located between the sides of the V-shaped elements of the connections 41.

In conclusion it may be stated that in its broader aspect, the invention comprises a tread spaced from the rim of the wheel and normally supported by the inflated cushions 3, there being connectors between the tread and rim in the form of the incasing members 24 which practically house or incase the cushions 3 at their outer sides. The inflation of the cushions 3 is such, of course, that the auxiliary or central cushion does not come into play or perform its cushioning function to any material extent until deflation of one or both of the cushions 3. In the use of the invention, there is no likelihood of failure of the auxiliary cushion to perform its function because it is not in a position in which it could be injured or damaged and therefore there is always provided a means to support the tread of the tire in spaced relation to the rim, notwithstanding injury causing deflation of the main cushion 3. Suitable air valves 43 are provided to facilitate inflation of the cushions 3 in the customary manner.

It is understood that certain parts of the invention as above set forth are susceptible of modification within the range of ordinary mechanical skill and alterations in the form and specific coöperation of the parts as set forth may be made as contemplated by the scope of the claims hereto appended.

If desired, fastenings 45 may be used to secure the flanges 24' of the incasing members 24 to the rim 2, said fastenings being in the form of bolts, the nuts of which are displaceable by the use of a socket wrench or similar tool.

Having thus described the invention, what is claimed as new is:

1. A tire comprising spaced inflatable cushions, an auxiliary cushion extending between the inflatable cushions, a tread mounted on said cushions, and incasing members detachably connected with the tread and inclosing the cushion member and adapted to detachably engage a rim.

2. A tire comprising inflatable cushions, an inflatable cushion interposed therebetween and normally deflated, a tread lying outside of and engaging said cushions, laterally disposed casings extending inwardly from the tread and detachably engaging the tread, said casings extending at the sides of the inflatable cushions in position for detachably engaging a rim, the inflatable cushions being accessible by detachment of said casings either from the rim or from the tread.

3. In combination, a rim, and a tire comprising a tread, annular inflatable cushions mounted on the rim and normally capable of holding the tread in spaced operative position in relation to said rim, and an annular resilient supporting member mounted on the rim and capable of sustaining the tread operatively spaced from said rim in the event of deflation of the inflatable cushion, said supporting member being composed of segments flexibly connected together, and said tread being composed of flexibly connected segments.

4. In combination, a rim, and a tire comprising a tread, annular inflatable cushions mounted on the rim and normally capable of holding the tread in spaced operative position in relation to said rim, and an annular resilient supporting member mounted on the rim and capable of sustaining the tread operatively spaced from said rim in the event of deflation of the inflatable cushion, said supporting member being composed of segments flexibly connected together and said tread being composed of flexibly connected segments, and means for detachably connecting the segments of the tread in position on the cushion and supporting member.

5. In combination, a rim, a tire thereon comprising spaced cushion members, an auxiliary cushion member intermediate the first named cushion members, a tread associated with said cushion members, and means mounted on the cushioning members detachably retaining the tread on said members whereby the tread may be removed to afford access to the auxiliary cushion member.

6. In combination, a rim, a tire thereon comprising spaced cushion members, an auxiliary cushion member intermediate the first named cushion members, a tread associated with said cushion members, located to require removal of the tread to afford access to the outermost portion of the auxiliary cushion, and means detachably retaining the first named cushions in position located to require displacement of one of such first-named cushions in order to afford access to the auxiliary cushion member from a side of the tire.

7. A resilient tire comprising a cushion composed of segments or sections, means flexibly connecting said sections together, a tread mounted upon said cushion and composed of segments corresponding with those of the cushion, and other cushions disposed at opposite sides of the above mentioned cushion and housing the latter.

8. In combination, a rim, a tire thereon comprising spaced inflatable cushions, an intermediate auxiliary cushion, a tread mounted on said cushions and spaced thereby from the rim, said tread being composed of segments separately detachable, and means normally housing the intermediate cushion and detachable for removal of a tread segment.

9. A tire comprising a pneumatic cushion, housings at opposite sides thereof, cushioning means outside said housings, and casings inclosing the last-mentioned cushioning means and detachably engaging the housings, and adapted to detachably engage a rim.

10. In combination, a rim, a tire thereon comprising spaced inflated cushions, an intermediate cushion, means housing the intermediate cushion, a tread supported by said cushions, and incasing members at opposite sides of the tire inclosing the said cushions and detachably connected with the housing means and with the rim.

In testimony whereof I affix my signature in presence of two witnesses.

HARRY McCLEARY.

Witnesses:
VELMA PEIRSON,
H. C. ROBB.